(12) United States Patent
Berglund

(10) Patent No.: US 9,288,940 B2
(45) Date of Patent: Mar. 22, 2016

(54) LAWN MOWER WITH TRANSPORT LOCK

(71) Applicant: Ariens Company, Brillion, WI (US)

(72) Inventor: Brent P. Berglund, Brillion, WI (US)

(73) Assignee: Ariens Company, Brillion, WI (US)

( * ) Notice: Subject to any disclaimer, the term of this patent is extended or adjusted under 35 U.S.C. 154(b) by 203 days.

(21) Appl. No.: 14/020,559

(22) Filed: Sep. 6, 2013

(65) Prior Publication Data

US 2014/0083069 A1   Mar. 27, 2014

Related U.S. Application Data

(60) Provisional application No. 61/703,910, filed on Sep. 21, 2012.

(51) Int. Cl.
| | |
|---|---|
| *A01D 34/00* | (2006.01) |
| *A01D 34/82* | (2006.01) |
| *A01D 34/64* | (2006.01) |
| *A01D 34/74* | (2006.01) |
| *A01D 34/66* | (2006.01) |

(52) U.S. Cl.
CPC ............... *A01D 34/82* (2013.01); *A01D 34/64* (2013.01); *A01D 34/661* (2013.01); *A01D 34/74* (2013.01)

(58) Field of Classification Search
CPC   A01D 34/74; A01D 2034/645; A01D 34/661
USPC .................................. 56/17.1, 15.8, DIG. 22
See application file for complete search history.

(56) References Cited

U.S. PATENT DOCUMENTS

| | | | | | |
|---|---|---|---|---|---|
| 4,120,136 | A | * | 10/1978 | Rose ............................... | 56/17.1 |
| 4,829,754 | A | * | 5/1989 | Shimamura et al. ........... | 56/15.9 |
| 5,816,033 | A | * | 10/1998 | Busboom et al. ............... | 56/10.8 |
| 5,927,055 | A | * | 7/1999 | Ferree et al. .................... | 56/15.9 |
| 6,494,028 | B2 | * | 12/2002 | Moore ............................ | 56/17.1 |
| 6,588,188 | B2 | * | 7/2003 | Dennis ........................... | 56/16.3 |
| 6,837,032 | B1 | * | 1/2005 | Swartzendruber et al. .... | 56/14.9 |
| 7,003,937 | B1 | * | 2/2006 | Tarver ............................ | 56/17.1 |
| 7,013,626 | B1 | * | 3/2006 | Strope ............................ | 56/15.8 |
| 7,197,863 | B1 | * | 4/2007 | Sugden .......................... | 56/15.9 |
| 7,213,662 | B2 | * | 5/2007 | Crumly ........................ | 180/6.48 |
| 7,318,311 | B2 | * | 1/2008 | Wright et al. .................. | 56/17.1 |
| 7,434,379 | B2 | * | 10/2008 | Nogami et al. ................ | 56/17.1 |
| 7,448,191 | B2 | | 11/2008 | Elhardt et al. | |
| 7,451,586 | B1 | * | 11/2008 | Papke et al. .................... | 56/15.9 |
| 7,520,114 | B2 | * | 4/2009 | Bergsten et al. ............... | 56/14.7 |
| 7,540,134 | B1 | | 6/2009 | Reich | |
| 7,578,117 | B2 | * | 8/2009 | Shaffer et al. .................. | 56/17.1 |
| 7,614,207 | B2 | | 11/2009 | Elhardt et al. | |

(Continued)

FOREIGN PATENT DOCUMENTS

| | | |
|---|---|---|
| CA | 2275171 | 12/2000 |
| EP | 1958492 | 8/2008 |

*Primary Examiner* — Árpád Fábián-Kovács
(74) *Attorney, Agent, or Firm* — Michael Best & Friedrich LLP

(57) ABSTRACT

A transport lock assembly for the mower deck of a lawn mower automatically engages when the deck is lifted to a clearance height. The transport lock assembly includes a transport lock that is biased into a locking position by a biasing member. The transport lock engages a surface of a deck prop that is also used in the lawn mower's height-of-cut assembly. The transport lock assembly includes a transport lock actuator that is used to disengage the transport lock, and also includes a transport lock disabling mechanism that prevents the transport lock from automatically engaging.

11 Claims, 9 Drawing Sheets

(56) References Cited

U.S. PATENT DOCUMENTS

| | | | |
|---|---|---|---|
| 7,770,370 B2* | 8/2010 | Komorida et al. | 56/17.1 |
| 8,438,822 B2 | 5/2013 | Lancaster et al. | |
| 2002/0059788 A1* | 5/2002 | Velke et al. | 56/14.7 |
| 2002/0194826 A1* | 12/2002 | Schick et al. | 56/15.9 |
| 2007/0169456 A1* | 7/2007 | Komorida et al. | 56/17.1 |
| 2008/0190087 A1 | 8/2008 | Elhardt et al. | |
| 2009/0031687 A1 | 2/2009 | Elhardt et al. | |
| 2009/0183481 A1 | 7/2009 | Lancaster et al. | |

* cited by examiner

LAWN MOWER WITH TRANSPORT LOCK

BACKGROUND

The present invention relates to a transport lock arrangement for the cutting deck of a lawn mower.

SUMMARY

In one embodiment, the invention provides a lawn mower comprising: a frame; a prime mover supported by the frame; a mower deck; a cutting blade mounted below the mower deck to cut vegetation under the mower deck; a deck lifting assembly for raising and lowering the mower deck with respect to the frame; a deck prop interconnected with the mower deck and movable with the mower deck; a transport lock movable between a locking position and a non-locking position; a biasing member biasing the transport lock toward the locking position; wherein the transport lock abuts a first surface of the deck prop to hold the transport lock in the non-locking position; wherein the transport lock moves into the locking position under the influence of the biasing member upon the mower deck achieving a clearance position; and wherein the transport lock in the locking position engages a second surface of the deck prop to retain the mower deck in a locked position.

In some embodiments, the invention further comprises a height-of-cut assembly that is adjustable to position a selected stop surface in an engagement position; wherein the deck prop engages the stop surface in the engagement position to hold the mower deck at a selected height-of-cut position. In some embodiments, the deck prop further includes a third surface against which the transport lock abuts while the mower deck is in the clearance position. In some embodiments, the transport lock is pivotable between the locking and non-locking positions.

In some embodiments, the invention further comprises a transport lock actuator interconnected with the transport lock and actuable to move the transport lock out of the locking position against the biasing force of the biasing member. In some embodiments, the transport lock actuator is movable in a first direction to move the transport lock out of the locking position and is movable in a second direction to move the transport lock into the locking position; wherein the biasing member acts on the transport lock actuator to bias the transport lock actuator in the second direction. In some embodiments, the transport lock actuator includes a handle graspable by an operator of the lawn mower to actuate the transport lock actuator. In some embodiments, the transport lock actuator is in an operator zone of the lawn mower accessible by an operator of the lawn mower during operation of the lawn mower.

In some embodiments, the invention further comprises a transport lock disabling mechanism for holding the transport lock in the non-locking position against the biasing force of the biasing member. In some embodiments, the invention further comprises a transport lock actuator interconnected with the transport lock and movable into a first position in which the transport lock actuator moves the transport lock into the non-locking position against the biasing force of the biasing member; wherein the transport lock disabling mechanism holds the transport lock actuator in the first position. In some embodiments, the transport lock actuator is pivotable in a pivot plane between the first and second positions; wherein the transport lock disabling mechanism includes a finger engageable with the transport lock actuator; and wherein the transport lock actuator is moved into engagement with the finger through movement of the transport lock actuator out of the pivot plane.

In some embodiments, the biasing member includes a linear acting spring. In some embodiments, the transport lock is pivotable about a horizontal axis between the locking and non-locking positions; wherein the transport lock pivots upwardly from the non-locking position to the locking position; and wherein the first surface of the deck prop is a downward-facing surface to resist upward pivoting of the transport lock.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
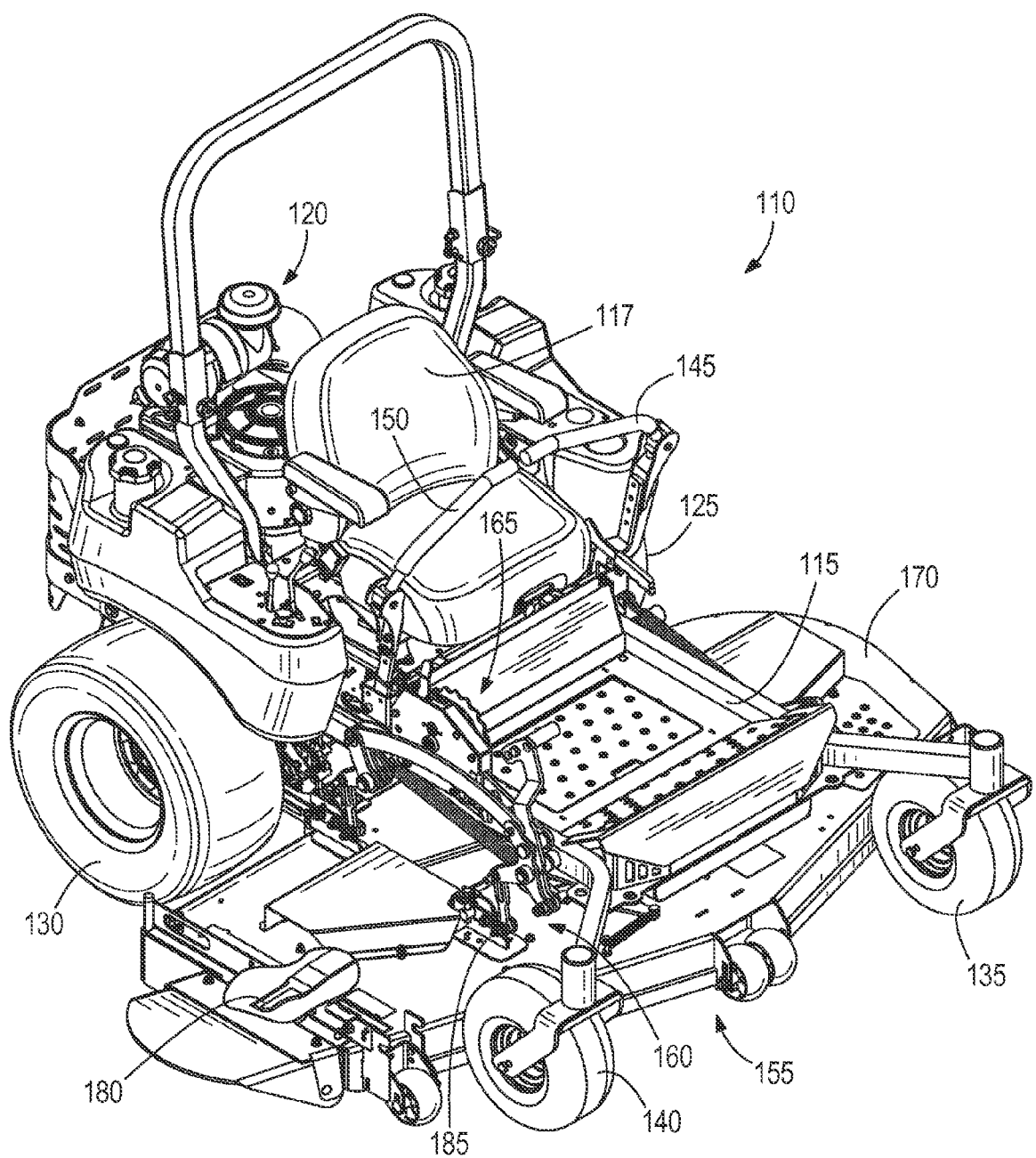
FIG. 1 is a perspective view of a lawn mower including a deck lifting assembly according to the present invention.
Figure 2:
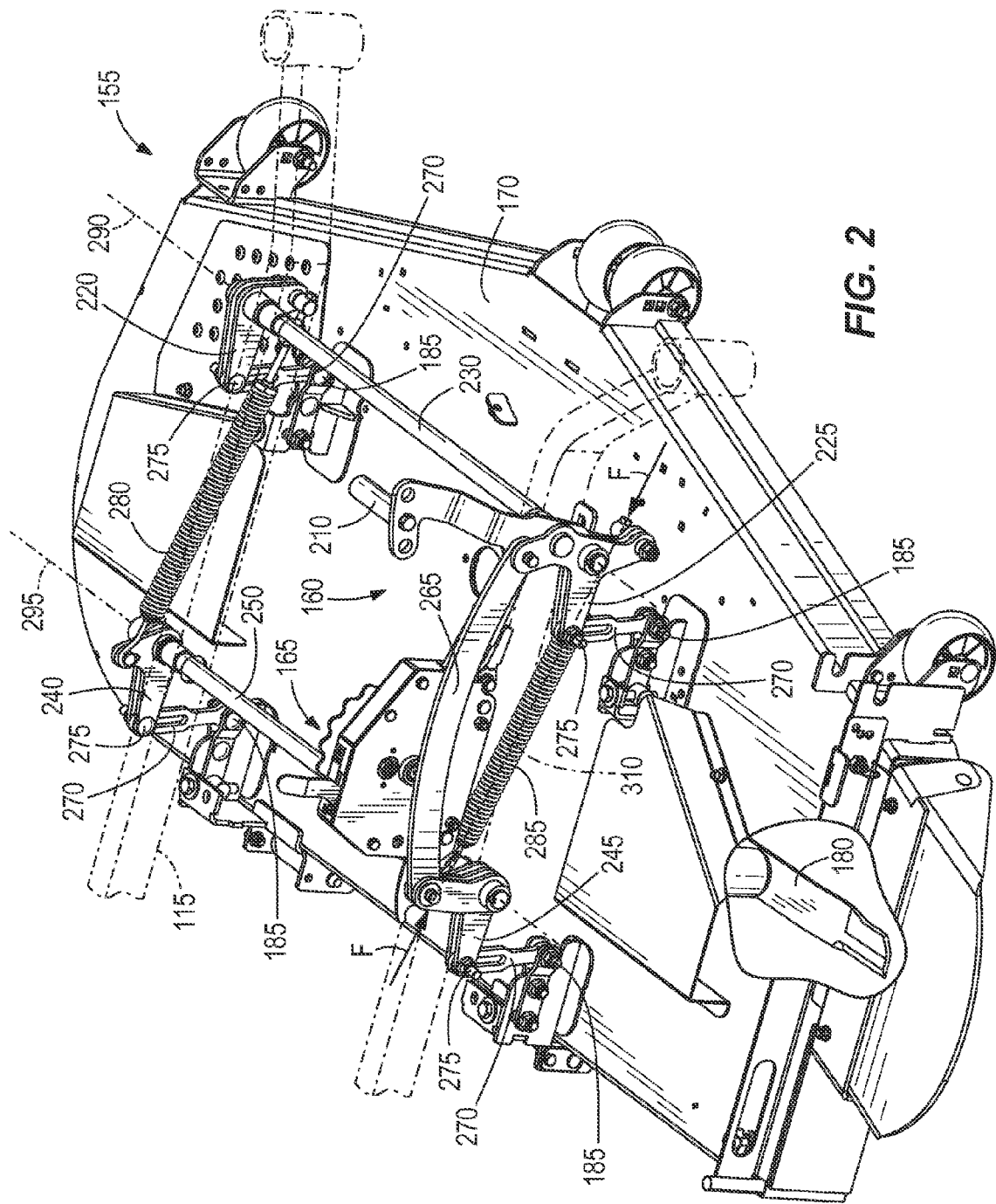
FIG. 2 is a perspective view of the deck lifting assembly.

FIGS. 1 and 2 illustrate a lawn mower 110 including a frame 115, a seat 117, a prime mover 120, left and right driven wheels 125, 130, left and right passive wheels 135, 140, left and right control arms 145, 150, a deck assembly 155, a deck lifting assembly 160, and a height-of-cut assembly 165. The terms "front," "rear," "left," and "right" will be used in this specification from the perspective of an operator seated on the lawn mower 110 during ordinary operation. The frame 115 is supported by the driven wheels 125, 130 and passive wheels 135, 140, and in turn supports the other components of the lawn mower 110. The prime mover 120 may be, for example, a gasoline powered internal combustion engine, but may also be any other type of prime mover such as an electric motor, a hybrid gas/electric motor, a fuel cell, or any other suitable device operating on a suitable fuel.

The left and right driven wheels 125, 130 are interconnected with the prime mover 120 through a power transmission and suitable hydraulic pumps and motors. The hydraulic pumps and motors are manipulated with the left and right control arms 145, 150, with the left control arm 145 controlling the direction and speed of rotation of the left driven wheel 125 and the right control arm 150 controlling the direction and speed of rotation of the right driven wheel 130.

The illustrated lawn mower 110 may be referred to as a zero-turn-radius lawn mower or ZTR lawn mower because when one of the control arms 145, 150 is pressed forward and the other control arm 145, 150 is pulled rearward, the lawn mower 110 will move in a very tight radius owing to one wheel rotating forward and the other rotating backwards. A ZTR lawn mower steers through the speed and direction difference of the two driven wheels. Further, the illustrated lawn mower 110 is a sitting lawn mower, in which the operator sits in the seat 117 during operation. The deck lifting assembly 160 discussed below is applicable to this type of lawn mower and also to any other type of lawn mower having a mower deck. Examples of other types of lawn mowers include large walk-behind units, standing mowers (in which the operator stands during operation), and tractors (in which a steering wheel is used instead of control arms, and the mower is not designed to execute zero-radius turns).

The deck assembly 155 includes a deck 170 and multiple cutting blades 180. The prime mover 120 drives rotation of the cutting blades 180 to cut vegetation (e.g., grass) under the deck 170. The deck 170 includes a plurality of mounting brackets with horizontal deck bolts 185.

The deck lifting assembly 160 includes a foot pedal 210, left and right front lifting brackets 220, 225, a front pivot shaft 230, left and right rear lifting brackets 240, 245, a rear pivot shaft 250, a right synchronizing arm 265, a lifting link 270 associated with each of the front and rear lifting brackets 220, 225, 240, 245, a lifting bolt 275 associated with each of the front and rear lifting brackets 220, 225, 240, 245, and left and right biasing members 280, 285. The foot pedal 210 is in the operator zone, which is defined as the region accessible by an operator on the lawn mower during ordinary operation. The foot pedal 210 is interconnected with the front pivot shaft 230 or with one of the front lifting brackets 220, 225, such that pivotal movement of the foot pedal 210 (e.g., under the influence of the operator's leg and foot) actuates the deck lifting assembly 160. Other types of deck lift actuators may be employed in place of or in addition to the foot pedal 210, including a hand lever.

The left and right front lifting brackets 220, 225 are rigidly mounted to opposite ends of the front pivot shaft 230, and the left and right rear lifting brackets 240, 245 are rigidly mounted to opposite ends of the rear pivot shaft 250. The front pivot shaft 230 defines a front pivot axis 290 and the rear pivot shaft 250 defines a rear pivot axis 295. The front lifting brackets 220, 225 pivot about the front pivot axis 290 with the front pivot shaft 230, and the rear lifting brackets 230, 235 pivot about the rear pivot axis 295 with the rear pivot shaft 250.

The right synchronizing arm 265 is pinned to each of the right front lifting bracket 225 and right rear lifting bracket 245. The right synchronizing arm 265 and the front and rear pivot shafts 230, 250 ensure that the front and rear lifting brackets 220, 225, 240, 245 pivot in a synchronized fashion.

The lifting links 270 are pinned at a top end to the lifting bolts 275 and at a bottom end to the deck bolts 185, and are thus interconnected between an associated lifting bracket 220, 225, 240, 245 and the deck 170. Each lifting bracket 220, 225, 240, 245 pivots about the associated horizontal pivot axis 290, 295 in a raising direction that lifts the deck 170 through the lifting link 270, and a lowering direction that permits the deck 170 to lower under the influence of gravity. In the illustrated embodiment, the raising direction of the right side lifting brackets 225, 245 is clockwise as seen from the right side. The raising direction of the left side lifting brackets 220, 240 is counterclockwise when viewed from the left side.

The left and right biasing members 280, 285 are provided in the form of linear coil springs, but in other embodiments can be any suitable alternative, such as air springs, torsion springs, compound springs having non-linear spring constants, and resilient material. The left biasing member 280 is interconnected at one end to the left front lifting bracket 220 and is interconnected at the opposite end to the left rear lifting bracket 240. The right biasing member 285 is interconnected at one end to the right front lifting bracket 225 and is interconnected at the opposite end to the right rear lifting bracket 245.

The biasing members 280, 285 directly apply torque in the raising direction on both brackets to which they are interconnected, which assists the operator lifting the deck assembly 155 through the foot pedal 210. The illustrated biasing members 280, 285 are linear springs that are characterized by a spring constant that results in a biasing force F when the spring is extended. The spring force F acts on each of the lifting brackets to which the spring is attached, directed along a longitudinal extent or longitudinal axis 310 of the spring. The illustrated linear springs operate in tension and may therefore also be called tension springs.

Variations in the illustrated embodiment fall within the scope of the present invention. For example, the shafts 230, 250 could be configured at 90° from the positions shown, so they extend forward and rearward along the respective left and right sides. The deck lifting brackets 220, 225, 240, 245 would also be turned 90° so that they pivot about horizontal axes 290, 295 extending forward and rearward.

Figure 3:
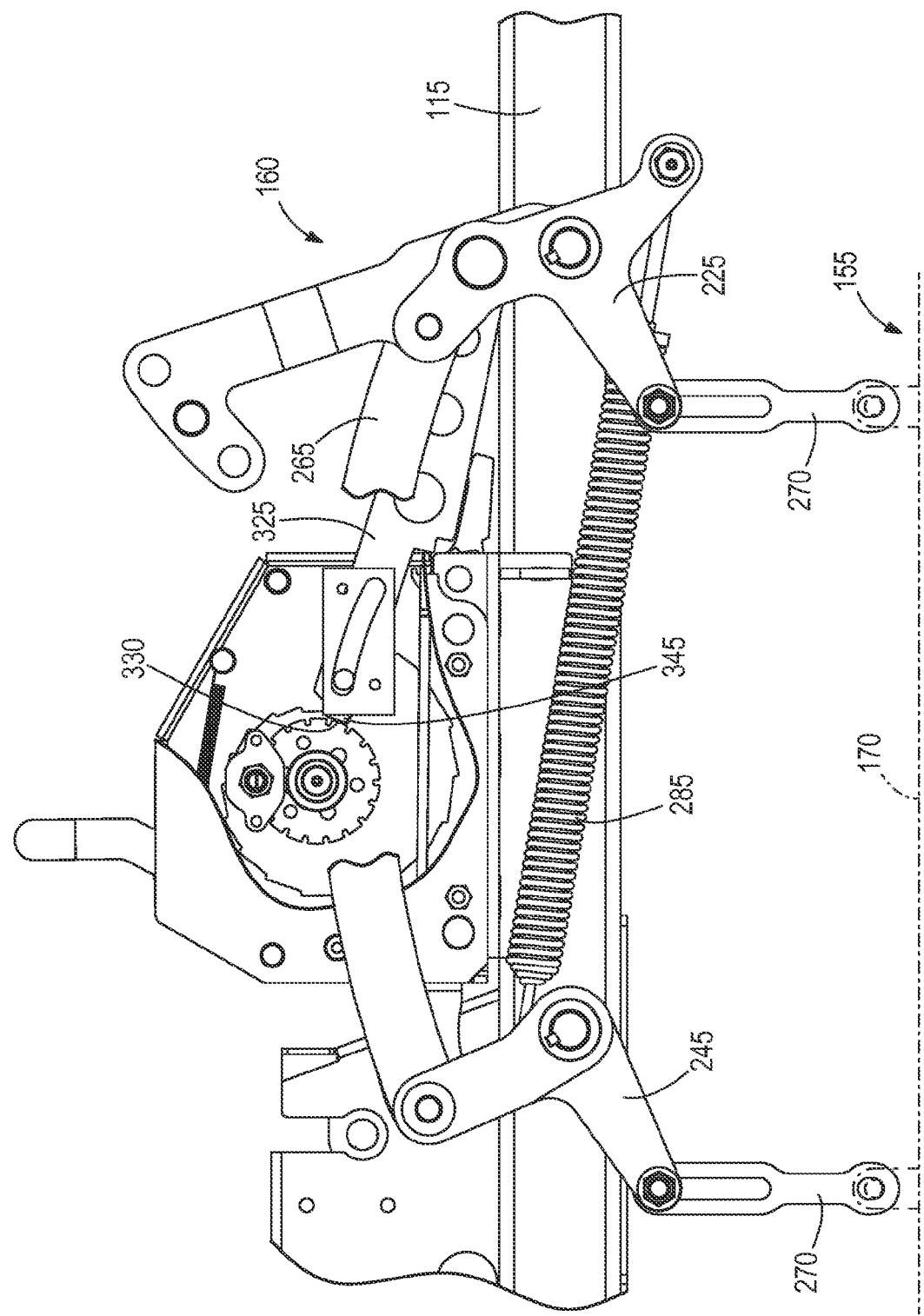
FIG. 3 is a side view of the deck lifting assembly in a full-down position.
Figure 4:
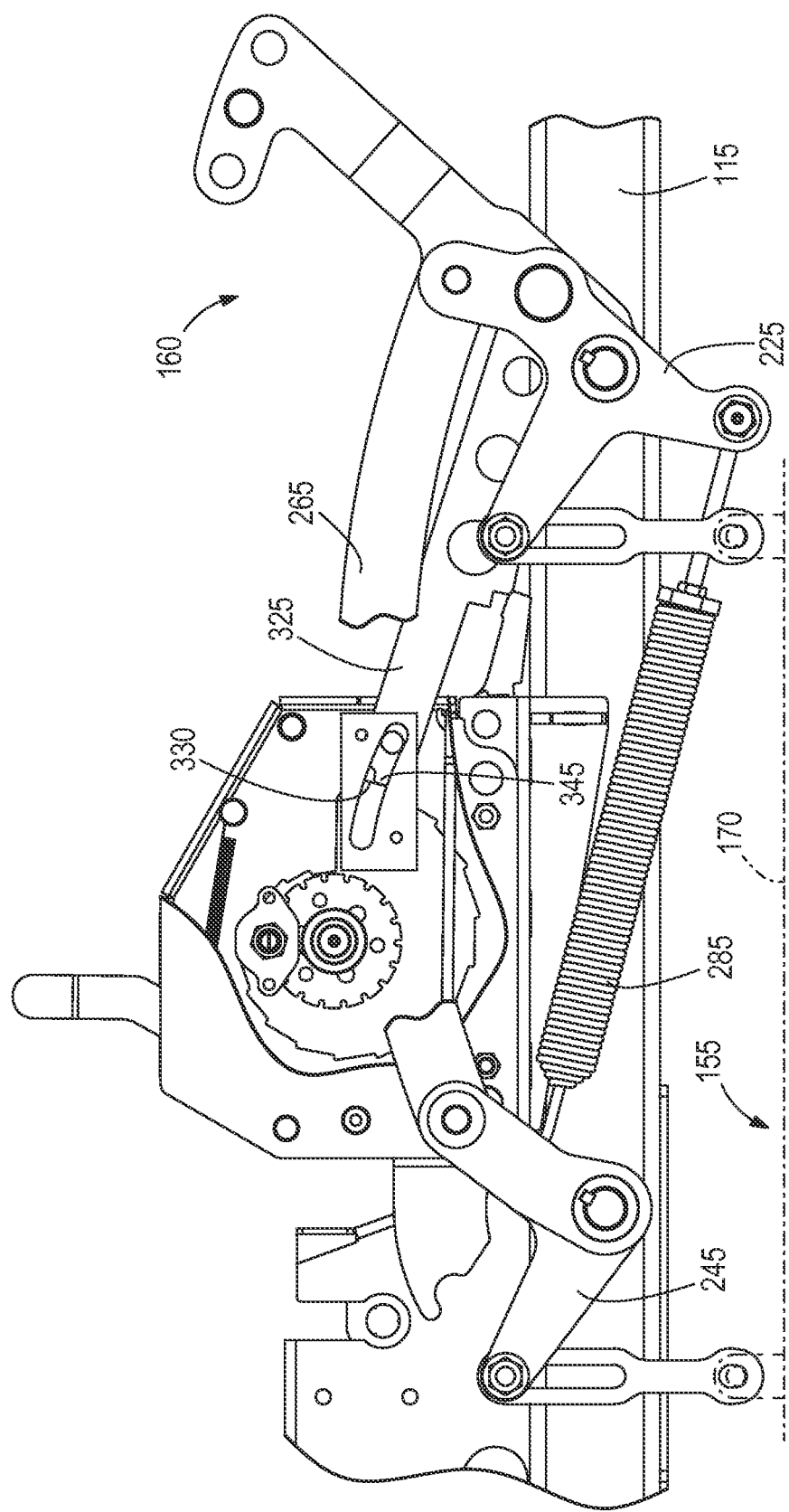
FIG. 4 is a side view of the deck lifting assembly at the highest height-of-cut setting provided by a height-of-cut assembly.

FIG. 3 illustrates the deck lifting assembly 160 in the fully lowered or "full-down" position, in which the deck assembly 155 is at the lowest end of its range of motion. This is the lowest cutting position permitted by the height-of-cut assembly 165. FIG. 4 illustrates the deck lifting assembly 160 in the highest height-of-cut setting provided by the height-of-cut assembly 165. The height of the deck assembly 155 with respect to the frame 115, and consequently with respect to the ground, determines the height of the cutting blades 180 and in turn the height to which grass is cut by the lawn mower 110.

Figure 5:
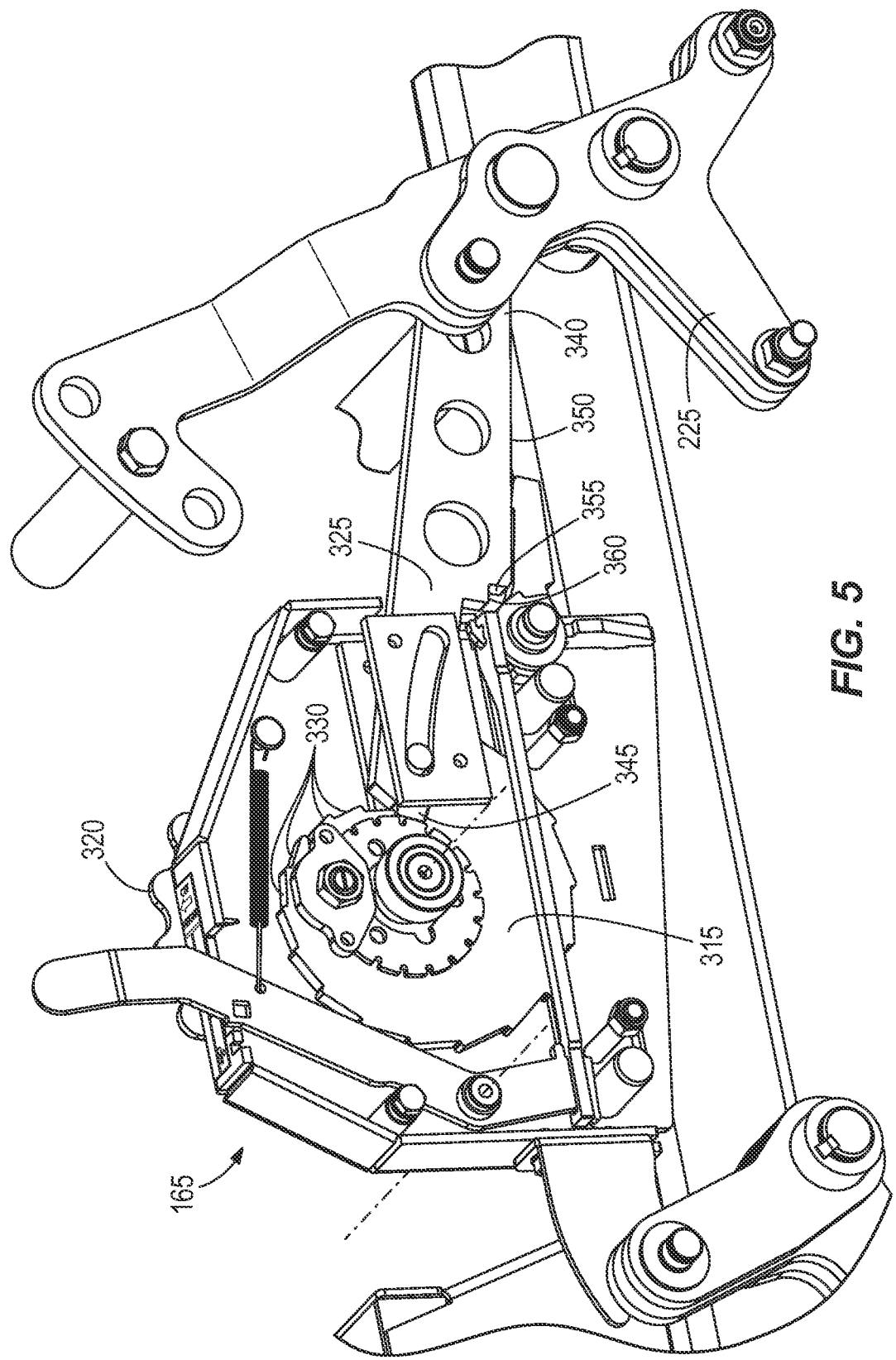
FIG. 5 is a perspective view of the height-of-cut assembly.

FIG. 5 illustrates the height-of-cut assembly 165, which includes an adjustable cam 315, a height-of-cut selector 320, and a deck prop 325. The adjustable cam 315 includes a plurality of stop surfaces 330, and the height of cut selector 320 is operable by the operator of the lawn mower 110 to rotate the adjustable cam 315 to position a selected stop surface 330 in an engagement position that is aligned with the deck prop 325. The stop surfaces 330 are at different radial distances from the axis of rotation of the adjustable cam 315.

The deck prop 325 includes a first end 340 that is pivotably mounted to one of the lifting brackets 220, 225, 240, 245 (the right front lifting bracket 225 in the illustrated embodiment) and a second end or free end 345 that engages the stop surface 330 that is in the engagement position. Engagement of the deck prop 325 against the stop surface 330 prevents further rotation of the lifting bracket 225 in the lowering direction. Because the lifting brackets 220, 225, 240, 245 are interconnected through the pivot shafts 230, 250 and the synchronizing arm 265, the deck prop 325 prevents pivoting of any of the lifting brackets 220, 225, 240, 245 in the lowering direction after coming into engagement with the stop surface 330.

When the deck prop 325 engages against the stop surface 330 at the smallest radial distance from the axis of rotation of the adjustable cam 315, the deck prop 325 holds the deck assembly 155 in the lowest height-of-cut position (FIG. 3). When the deck prop 325 engages the stop surface 330 at the largest radial distance, the deck prop 325 holds the deck assembly 155 at the highest height-of-cut position provided by the height-of-cut assembly 165 (FIG. 4). In one exemplary embodiment, the lowest height-of-cut setting afforded by the height-of-cut assembly 165 is one inch (1.00 in.) and the highest height-of-cut setting is five and a quarter inches (5.25 in.). The stop surfaces 330 between the lowest and highest settings permit incremental changes (e.g., 0.25 in. increments) to height-of-cut between the lowest and highest settings.

The deck prop 325 includes a first downward-facing surface 350 along its lower side, a second surface 355 extending vertically from the first surface 350, and a third surface 360 extending rearwardly from the second surface 355. The surfaces 350, 355, 360 are formed in the deck prop 325 between the ends 340, 345, nearly at the midpoint of the deck prop 325.

Figure 6:
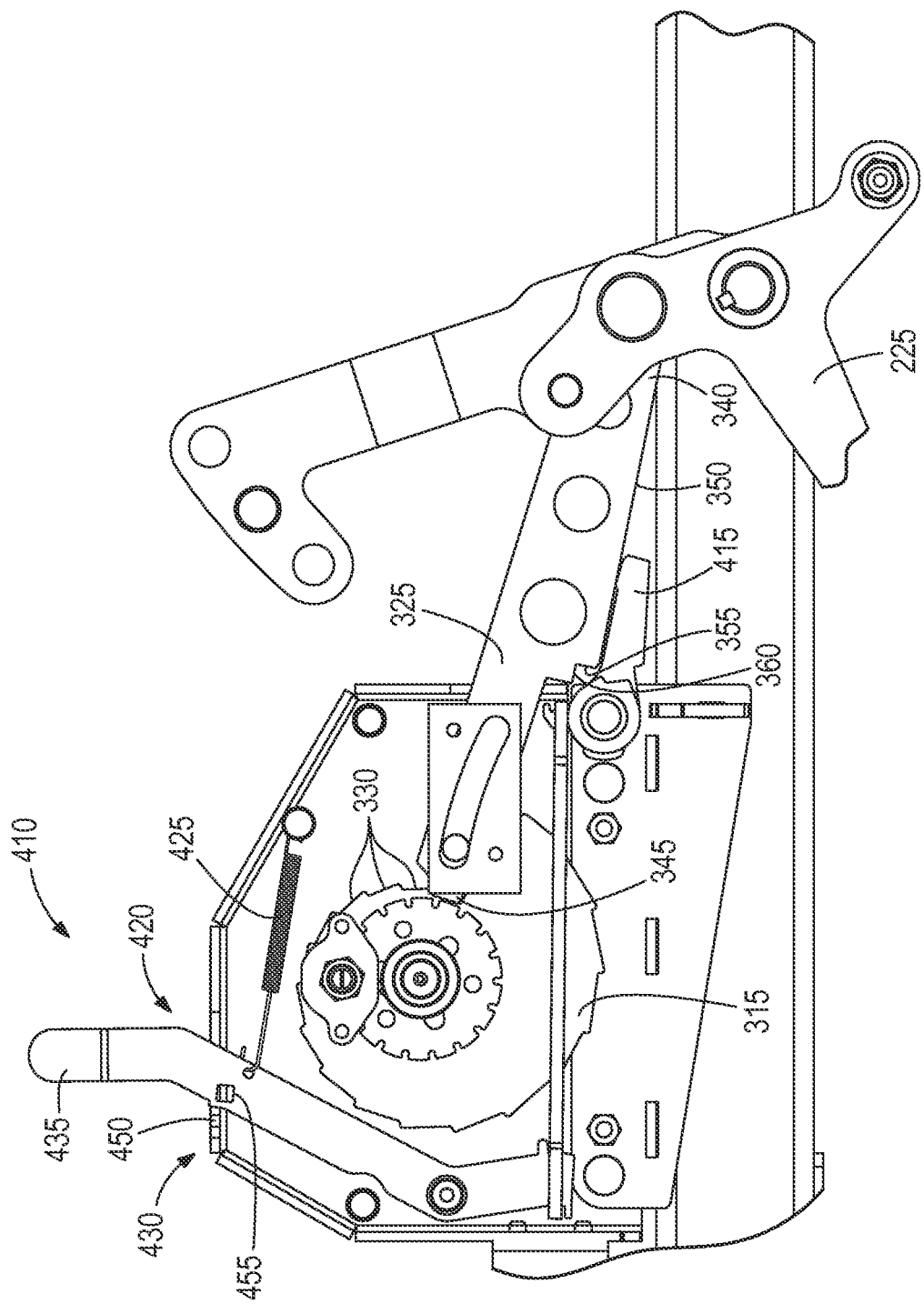
FIG. 6 is a side view of a transport lock in a non-locking position.
Figure 7:
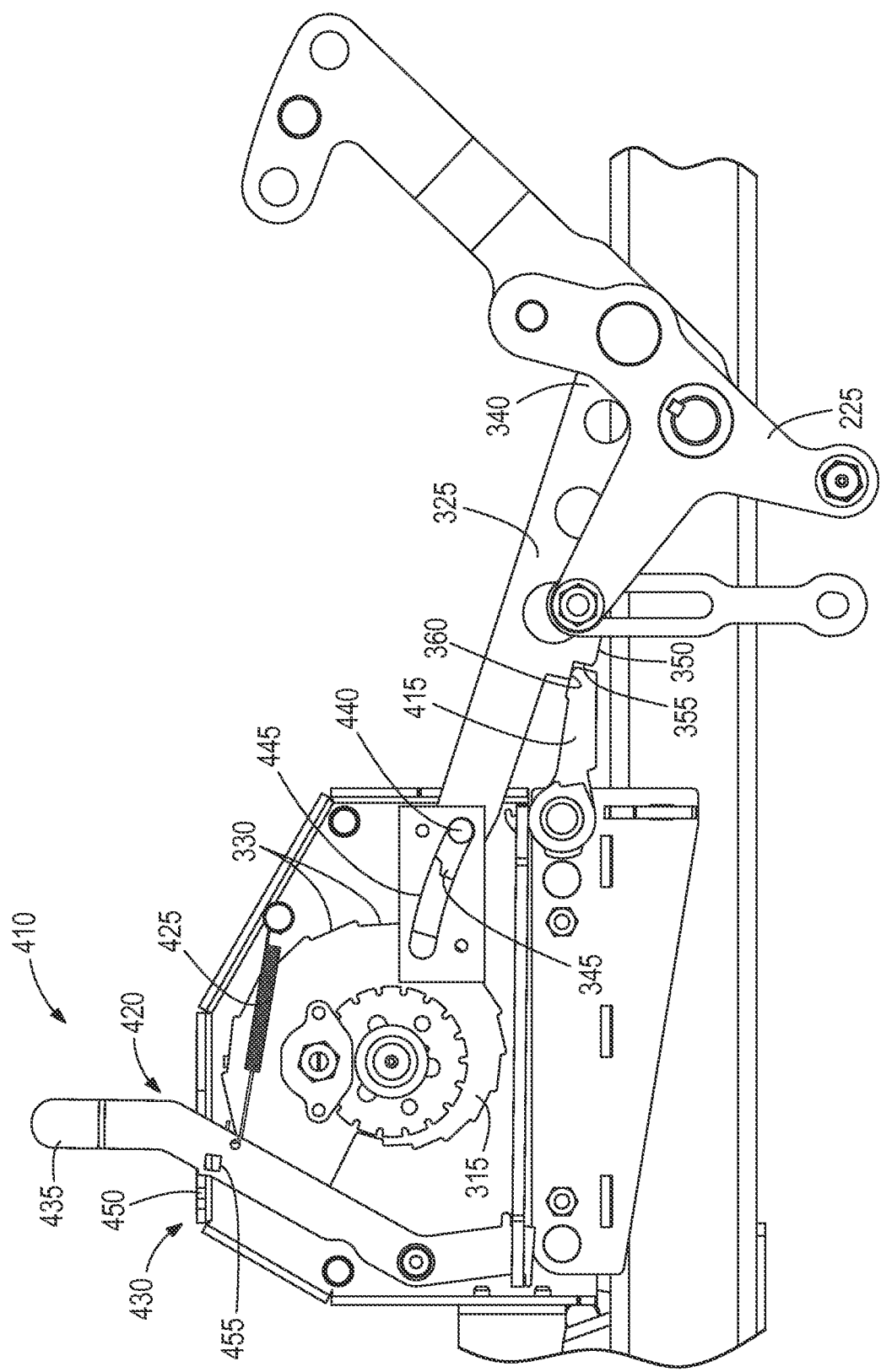
FIG. 7 is a side view of the transport lock in a locking position with the deck assembly in a full-up position and prior to the deck assembly weight being borne by the transport lock.
Figure 8:
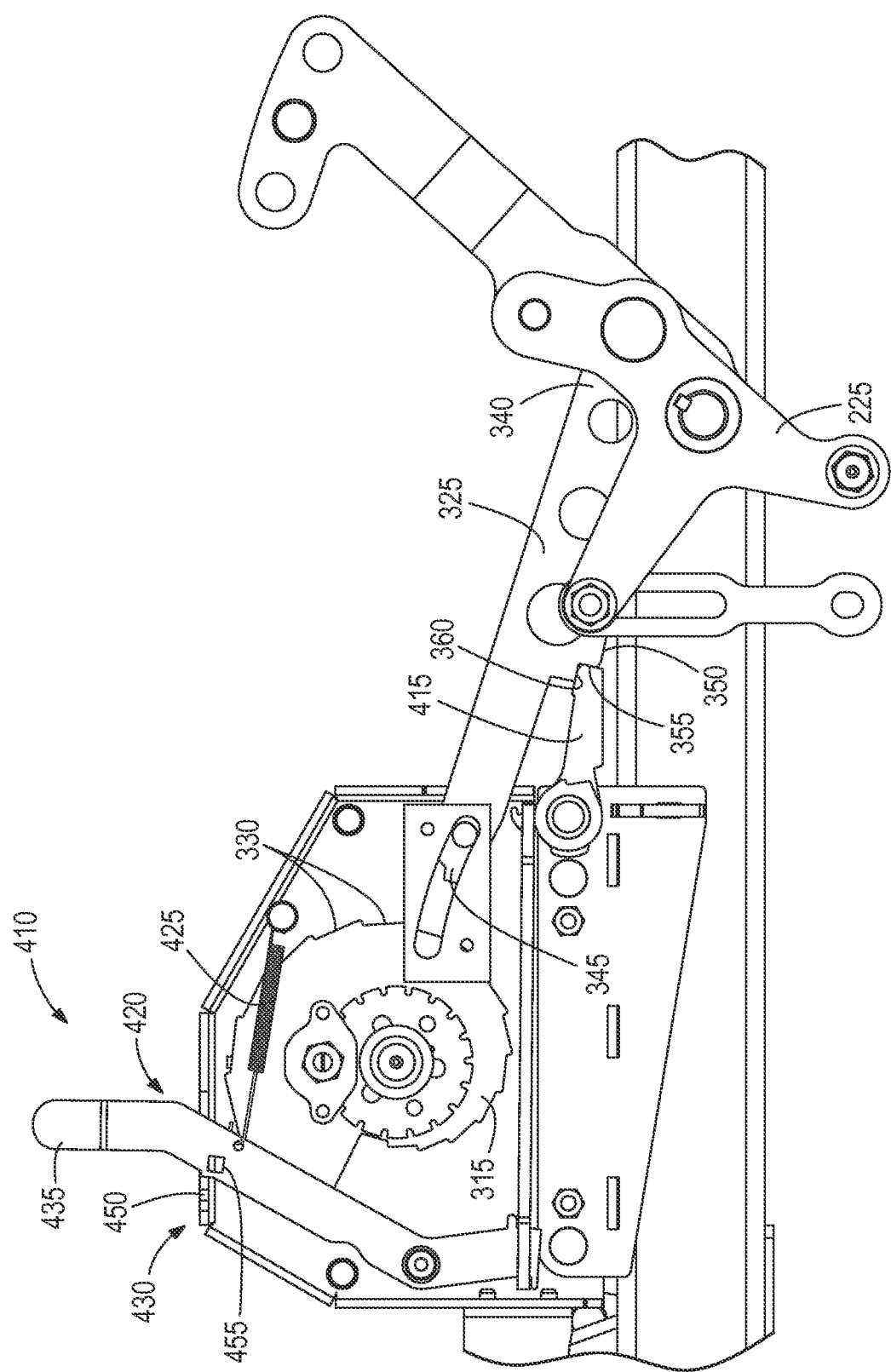
FIG. 8 is a side view of the transport lock in the locking position with the deck assembly weight being borne by the transport lock.

With reference to FIGS. 6-8, the lawn mower 110 also has a transport lock assembly 410, which includes a transport lock 415, a transport lock actuator 420, a biasing member 425, and a transport lock disabling mechanism 430. The transport lock 415 pivots about a horizontal pivot axis between a locking position (up) and a non-locking position (down).

The transport lock actuator 420 includes a handle 435 graspable by an operator of the lawn mower 110 to actuate the transport lock actuator 420. The handle 435 is pivotable about a horizontal axis. The handle 435 is actuated by an operator in the operator zone. When pivoted rearward, the transport lock actuator 420 pivots the transport lock 415 down toward the non-locking position, and when pivoted forward, the transport lock actuator 420 pivots the transport lock 415 up toward the locking position.

The biasing member 425 is a tension spring (i.e., a linear biasing member) in the illustrated embodiment, and applies a biasing force on the transport lock actuator 420 to bias the transport lock actuator 420 forward to bias the transport lock 415 toward the locking position. In other embodiments, the biasing member 425 may be a torsion spring, an air spring, or any other suitable biasing member. The transport lock 415 is below the deck prop 325 and is held in the non-locking position by abutting against the first surface 350 of the deck prop 325 as illustrated in FIG. 6. The transport lock 415 can be positioned above or beside the deck prop 325 in other configurations.

FIG. 7 illustrates the deck lifting assembly 160 in the fully raised or "full-up" position, in which the deck assembly 155 is raised to the highest end of its range of motion. A range limiting pin 440 on the deck prop 325 follows a range limiting slot 445 on the frame 115. The full-up position is achieved in the illustrated embodiment when the range limiting pin 440 reaches the end of the range limiting slot 445 as illustrated in FIG. 7. As the deck 170 is raised toward the full-up position, the transport lock 415 clears the first surface 350, is pivoted up under the influence of the biasing member 425, and is stopped by the third surface 360. The deck height or position at which the transport lock 415 clears the first surface 350 can be referred to as a "clearance position," which may be higher than or about the same as the locked position. The clearance position will typically be a little lower than the full-up position.

When the weight of the deck 170 is released down onto the transport lock 415 (FIG. 8), the transport lock 415 bears against the second surface 355 to support the deck in a locked position for travel between mowing locations or mowing at that height. In the illustrated embodiment, the deck prop 325 is disengaged from the adjustable cam 315 while in the locked position.

It should be noted that the deck assembly 155 is fully operational in the full-up and locked positions. In other words, one could lock the deck assembly 155 in the locked position and still cut grass under the deck. The locked position (FIG. 8) is lower than the clearance position and full-up position (FIG. 7) and higher than the highest height-of-cut setting (FIG. 4) in the illustrated embodiment. In one example embodiment, the height-of-cut in the locked position is five and a half inches (5.50 in.), which is a quarter inch higher than the highest height-of-cut afforded by the height-of-cut assembly 165.

One could also mow grass while holding the deck assembly 155 in the full-up position if the operator pushes on the foot pedal 210 to position the range limiting pin 440 at the end of the range limiting slot 445 and hold the deck assembly 155 in the full-up position. The height-of-cut in the full-up position is higher than that of the locked position, and may be, for example, five and three-quarters inches (5.75 in.).

Thus, the transport lock 415 automatically moves into the locking position when the deck assembly 155 is raised to the clearance position. Then the deck assembly 155 is lowered into the locked position in which the transport lock 415 engages the deck prop 325 and supports the weight of the deck assembly 155. To disengage the transport lock 415, the deck assembly 155 is lifted (e.g., by pushing on the pedal 210) above the locked position (e.g., to the clearance position or higher) to relieve weight from the transport lock 415, and the transport lock actuator 420 is actuated (i.e., by pulling back on the transport lock handle 435) to pivot the transport lock 415 to the non-locking position. The deck assembly 155 can then be lowered past the locked position until the deck prop 325 engages the stop surface 330 of the adjustable cam 315 that is in the engagement position.

Figure 9:
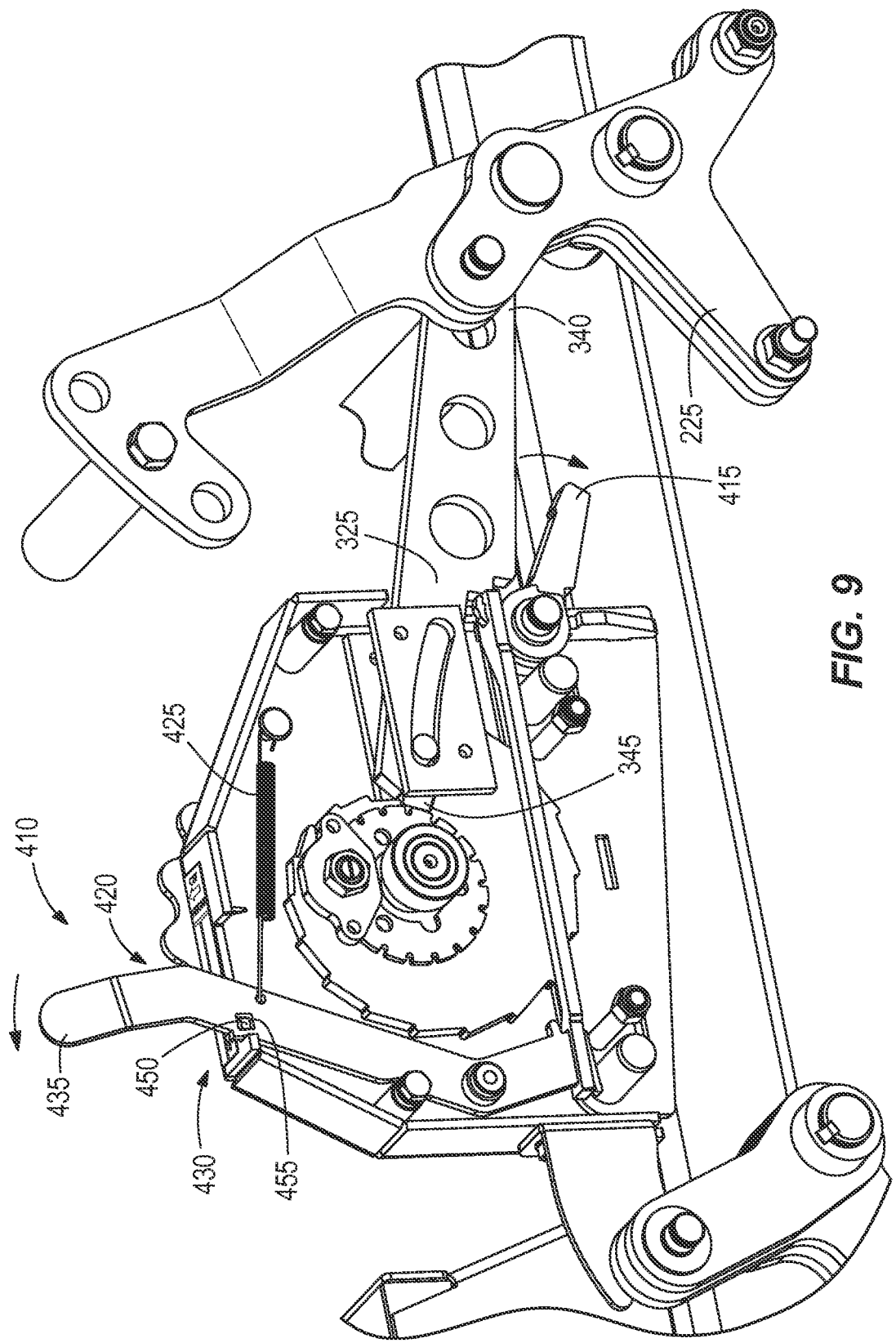
FIG. 9 is a perspective view of the transport lock in a non-locking position.

Referring now to FIG. 9, the transport lock disabling mechanism 430 includes a finger 450 in the frame of the assembly and a hole 455 in the transport lock actuator 420. The finger 450 and hole 455 can be reversed in other embodiments, and other arrangements can be employed to achieve the same function. When the finger 450 is received in the hole 455 the transport lock actuator 420 is held in the rearward position and the transport lock 415 is held in the non-locking position against the biasing force of the biasing member 425. In this position, the transport locking assembly 410 is disabled and will not automatically move the transport lock 415 into the locking position.

The handle 435 of the transport lock actuator 420 is pivotable in a pivot plane between the forward and rearward positions. The transport lock disabling mechanism 430 is engaged (i.e., the finger 450 is moved into engagement with the hole 455) through movement of the handle 435 out of the pivot plane and then back into the pivot plane when the finger 450 and hole 455 are aligned. The out-of-plane movement can be handled by a spring-biased pivot at the based of the handle 435 or can simply be accommodated by the flexible, resilient properties of the handle 435. The required out-of-plane deflection of the handle 435 can be very minimal and would not be sufficient to permanently bend the handle 435.

Thus, the invention provides, among other things, a lawn mower with a transport lock that automatically engages up on raising the mower deck to a clearance position. The transport lock interacts with a deck prop that is also used for the height-of-cut assembly. The transport lock includes a disabling mechanism to prevent the automatic engagement. Various features and advantages of the invention are set forth in the following claims.

What is claimed is:

1. A lawn mower comprising:
   a frame;
   a prime mover supported by the frame;
   a mower deck;
   a cutting blade mounted below the mower deck to cut vegetation under the mower deck;
   a deck lifting assembly for raising and lowering the mower deck with respect to the frame;
   a deck prop interconnected with the mower deck and movable with the mower deck;
   a transport lock movable between a locking position and a non-locking position;
   a biasing member biasing the transport lock toward the locking position; and
   a transport lock actuator interconnected with the transport lock and movable into a first position in which the transport lock actuator moves the transport lock into the non-locking position against the biasing force of the biasing member; and
   a transport lock disabling mechanism for holding the transport lock in the non-locking position against the biasing force of the biasing member, the transport lock disabling mechanism including a projection mounted to the frame, the projection selectively engaging the transport lock actuator to hold the transport lock actuator in the first position;
   wherein the transport lock abuts a first surface of the deck prop to hold the transport lock in the non-locking position;
   wherein the transport lock moves into the locking position under the influence of the biasing member upon the mower deck achieving a clearance position; and
   wherein the transport lock in the locking position engages a second surface of the deck prop to retain the mower deck in a locked position.

2. The lawn mower of claim 1, further comprising a height-of-cut assembly that is adjustable to position a selected stop surface in an engagement position; wherein the deck prop engages the stop surface in the engagement position to hold the mower deck at a selected height-of-cut position.

3. The lawn mower of claim 1, wherein the deck prop further includes a third surface against which the transport lock abuts while the mower deck is in the clearance position.

4. The lawn mower of claim 1, wherein the transport lock is pivotable between the locking and non-locking positions.

5. The lawn mower of claim 1, further comprising a transport lock actuator interconnected with the transport lock and actuable to move the transport lock out of the locking position against the biasing force of the biasing member.

6. The lawn mower of claim 5, wherein the transport lock actuator is movable in a first direction to move the transport lock out of the locking position and is movable in a second direction to move the transport lock into the locking position; wherein the biasing member acts on the transport lock actuator to bias the transport lock actuator in the second direction.

7. The lawn mower of claim 5, wherein the transport lock actuator includes a handle graspable by an operator of the lawn mower to actuate the transport lock actuator.

8. The lawn mower of claim 5, wherein the transport lock actuator is in an operator zone of the lawn mower accessible by an operator of the lawn mower during operation of the lawn mower.

9. The lawn mower of claim 1, wherein the biasing member includes a linear acting spring.

10. The lawn mower of claim 1, wherein the transport lock is pivotable about a horizontal axis between the locking and non-locking positions; wherein the transport lock pivots upwardly from the non-locking position to the locking position; and wherein the first surface of the deck prop is a downward-facing surface to resist upward pivoting of the transport lock.

11. A lawn mower comprising:
    a frame:
    a prime mover supported by the frame;
    a mower deck;
    a cutting blade mounted below the mower deck to cut vegetation under the mower deck;
    a deck lifting assembly for raising and lowering the mower deck with respect to the frame;
    a deck Prop interconnected with the mower deck and movable with the mower deck;
    a transport lock movable between a locking position and a non-locking position;
    a biasing member biasing the transport lock toward the locking position;
    a transport lock disabling mechanism for holding the transport lock in the non-locking position against the biasing force of the biasing member; and
    a transport lock actuator interconnected with the transport lock and movable into a first position in which the transport lock actuator moves the transport lock into the non-locking position against the biasing force of the biasing member, the transport lock disabling mechanism holds the transport lock actuator in the first position;
    wherein the transport lock abuts a first surface of the deck prop to hold the transport lock in the non-locking position;
    wherein the transport lock moves into the locking position under the influence of the biasing member upon the mower deck achieving a clearance position;
    wherein the transport lock in the locking position engages a second surface of the deck prop to retain the mower deck in a locked position; and
    wherein the transport lock actuator is pivotable in a pivot plane between the first and second positions; wherein the transport lock disabling mechanism includes a projection engageable with the transport lock actuator; and wherein the transport lock actuator is moved into engagement with the projection through movement of the transport lock actuator out of the pivot plane.

* * * * *